United States Patent
Norris

(10) Patent No.: US 9,137,068 B2
(45) Date of Patent: Sep. 15, 2015

(54) WIRELESS COMMUNICATIONS DEVICE HAVING TEMPORARY CORRELATION MATRIX WITH TIME INVERSION AND RELATED METHODS

(75) Inventor: James A. Norris, Fairport, NY (US)

(73) Assignee: HARRIS CORPORATION, Melbourne, FL (US)

( * ) Notice: Subject to any disclaimer, the term of this patent is extended or adjusted under 35 U.S.C. 154(b) by 241 days.

(21) Appl. No.: 13/398,293

(22) Filed: Feb. 16, 2012

(65) Prior Publication Data

US 2013/0216007 A1    Aug. 22, 2013

(51) Int. Cl.
    *H03D 1/00*     (2006.01)
    *H04L 27/20*     (2006.01)
    *H04L 27/227*     (2006.01)

(52) U.S. Cl.
    CPC .......... *H04L 27/2003* (2013.01); *H04L 27/227* (2013.01)

(58) Field of Classification Search
    USPC .......................................................... 375/343
    See application file for complete search history.

(56) References Cited

U.S. PATENT DOCUMENTS

| | | | |
|---|---|---|---|
| 7,088,793 B1* | 8/2006 | Mickelson et al. | 375/341 |
| 7,636,399 B2* | 12/2009 | Brown et al. | 375/260 |
| 2010/0174963 A1* | 7/2010 | Kienle et al. | 714/752 |
| 2010/0309959 A1* | 12/2010 | Lakkis | 375/150 |
| 2013/0342327 A1* | 12/2013 | Wang et al. | 340/10.1 |

* cited by examiner

*Primary Examiner* — Tanmay Shah
(74) *Attorney, Agent, or Firm* — Allen, Dyer, Doppelt, Milbrath & Gilchrist, P.A.

(57) ABSTRACT

A wireless communications device may include a receiver configured to receive a continuous phase modulation (CPM) signal and a demodulator coupled downstream from the receiver. The demodulator may be configured to generate a CPM correlation matrix based upon an expected CPM signal, and generate a temporary correlation matrix. The temporary correlation matrix may include a first copy of the CPM correlation matrix inverted in time, and a second copy of the CPM correlation matrix.

25 Claims, 5 Drawing Sheets

TRELLIS DIAGRAM FOR h = 1/3 4-ary cpm (6-TRELLIS STATES)

WIRELESS COMMUNICATIONS DEVICE HAVING TEMPORARY CORRELATION MATRIX WITH TIME INVERSION AND RELATED METHODS

FIELD OF THE INVENTION

The present invention relates to the field of communications, and, more particularly, to a continuous phase modulation wireless communications device and related methods.

BACKGROUND OF THE INVENTION

Continuous phase modulation (CPM) is a widely used modulation format. For example, the global system for mobile communications (GSM) uses the gaussian minimum shift-keyed (GMSK) modulation format that is based upon frequency, phase, gain/amplitude, and timing recovery feedback loops to achieve a theoretically optimal bit-error rate (BER) performance. Although computationally intensive, a CPM signal may be demodulated with a non-coherent decoder, and may still match the optimal coherent bit error rate. Ultra high frequency (UHF) satellite communications (UHF follow-on (UFO) SATCOM) may severely distort the transmitted signal, thus causing increased loss in power efficiency or bit error rate performance.

Non-coherent decoding of CPM signals typically requires correlation banks that are matched to the expected I&Q signal values over several symbol periods. The received signal is compared to each possible valid combination of symbols across multiple symbol periods. The best correlation may indicate the most likely symbol transmitted. U.S. Pat. No. 7,636,399 to Brown et al. discloses a non-coherent receiver comprising a bank of CPM waveform matched filters for obtaining branch metrics for each consecutive CPM symbol. The device also includes a recursive inner decoder cooperating with the bank of filters.

Non-coherent CPM decoding is based upon the phase being continuous throughout the multi-symbol correlation process. This may not match the definition of traditional "non-coherent" demodulation. Thus, another more appropriate term may be "quasi-coherent." This multi-symbol correlation process may not be based upon the receiver recovering the transmitted phase of the incoming signal, as is typically performed with a phase-lock loop (PLL). A receiver that generates a copy of the transmitted carrier frequency and phase is typically defined as a coherent receiver.

Some communications modes use a burst/packet communications waveform and operate in a harsh interference environment, for example, for communications over a satellite channel. Due to the nature of these communications modes, a coherent receiver may be increasingly difficult to design, as it is typically difficult to recover the transmit carrier frequency and phase.

Accordingly, a receiver that operates in such modes may use the quasi-coherent CPM demodulation technique. However, the distortion and intersymbol-interference induced by a satellite channel, for example, a 5 kHz UHF satellite channel, generally causes an irreducible bit error rate (1E-4 for a FSK receiver, 1E-5 for a non-coherent CPM receiver).

A standard for UHF satellite communications (Integrated Waveform) includes CPM modems that may be used on UHF satellite transponders. IW supersedes Demand-Assigned Multiple Access" (DAMA) MIL-STD-188-182 (A), MIL-STD-188-183 (A) military interoperabilty standards for UHF Follow-On (UFO) Satellite Communications. IW is described in MIL-STD-188-181C, MIL-STD-188-182B, and MIL-STD-188-183B interoperability standards. There are two transponder types that are designed to support two channel bandwidths—25 kHz and 5 kHz.

To meet the bit error rate requirements, terminals or receivers may use least mean square (LMS) equalization. LMS equalization uses an error calculation that is based on the difference between the expected received signal and the actual received signal. If the expected received signal that is generated for this difference does not account for the carrier frequency and phase, or the actual received signal is not modified to remove the carrier frequency and phase offset, the LMS receiver attempts to remove the carrier frequency and phase because it will see it as an error.

Unfortunately, for UFO satellite communications, the LMS linear equalizer cannot simultaneously adequately address both the inter-symbol interference (ISI distortion) caused by the satellite channel and the carrier frequency and phase offset. An LMS equalizer will attempt to adapt to any channel impairment, with some loss due to the inability of a linear filter to accurately model a satellite channel with both linear and non-linear impairments. An LMS equalizer will also attempt to remove phase, frequency, timing, and any other error. However, it is increasingly difficult to measure error in an LMS equalizer.

Error is defined as any difference (typically complex-valued in-phase and quadrature) between the received signal and the expected/desired signal. Thus, a received signal with a frequency offset may appear as an error to the least-mean-squares error calculation and the linear filter that is at the receiver to be used to approximate the channel. This linear filter typically has coefficients that are modified using the LMS coefficient calculation to remove the frequency error. Typically, frequency, phase, and timing errors are not expected, but rather they are known ahead of time.

U.S. Pat. No. 7,088,793 to Mickelson et al. discloses an equalizer for use with complex modulation modems to reduce inter-symbol interference. The equalizer includes an equalizer filter that receives an input data signal and adapts the input signal to compensate for the noisy communications channels to reduce inter-symbol interference. A branch metric computer demodulates the equalizer filter adapted input data signal.

SUMMARY OF THE INVENTION

In view of the foregoing background, it is therefore an object of the present invention to provide a demodulator with improved performance, such as based upon a lower BER.

This and other objects, features, and advantages in accordance with the present invention are provided by a wireless communications device that includes a receiver configured to receive a continuous phase modulation (CPM) signal and a demodulator coupled downstream from the receiver. The demodulator is configured to generate a CPM correlation matrix based upon an expected CPM signal and generate a temporary correlation matrix. The temporary correlation matrix includes a first copy of the CPM correlation matrix inverted in time, and a second copy of the CPM correlation matrix. Accordingly, the wireless communications device may demodulate CPM signals with improved quality of service (QoS), such as BER, for example, over a noisy or distorted channel.

A method aspect is directed to a method of demodulating a continuous phase modulation (CPM) signal with a wireless communications device that includes a demodulator coupled downstream from a receiver. The method generating a CPM correlation matrix based upon an expected CPM signal using the demodulator, and generating a temporary correlation matrix that includes a first copy of the CPM correlation matrix inverted in time, and a second copy of the CPM correlation matrix using the demodulator.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
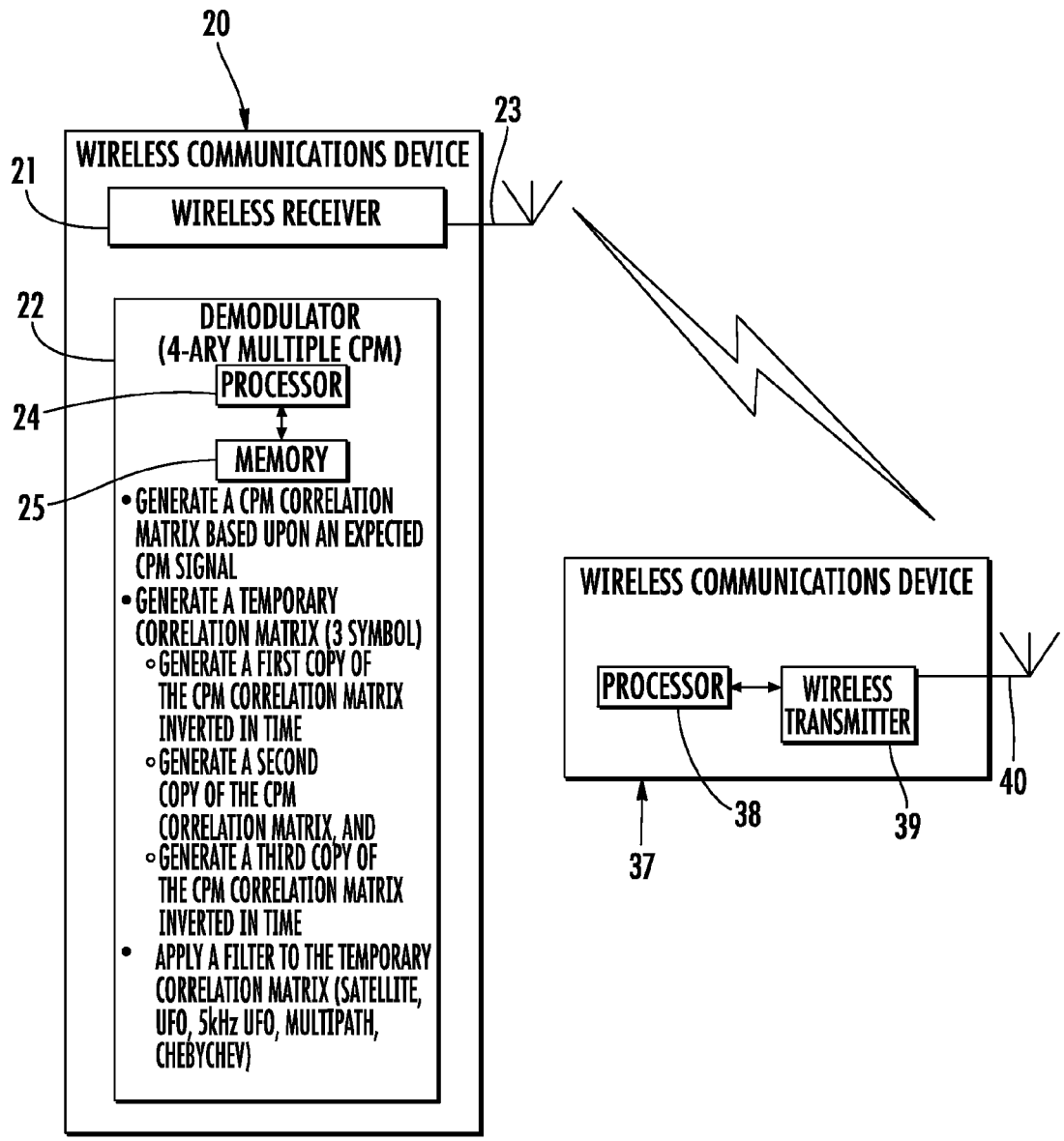
FIG. 1 is schematic diagram of a wireless communications device according to the present invention.
Figure 2:
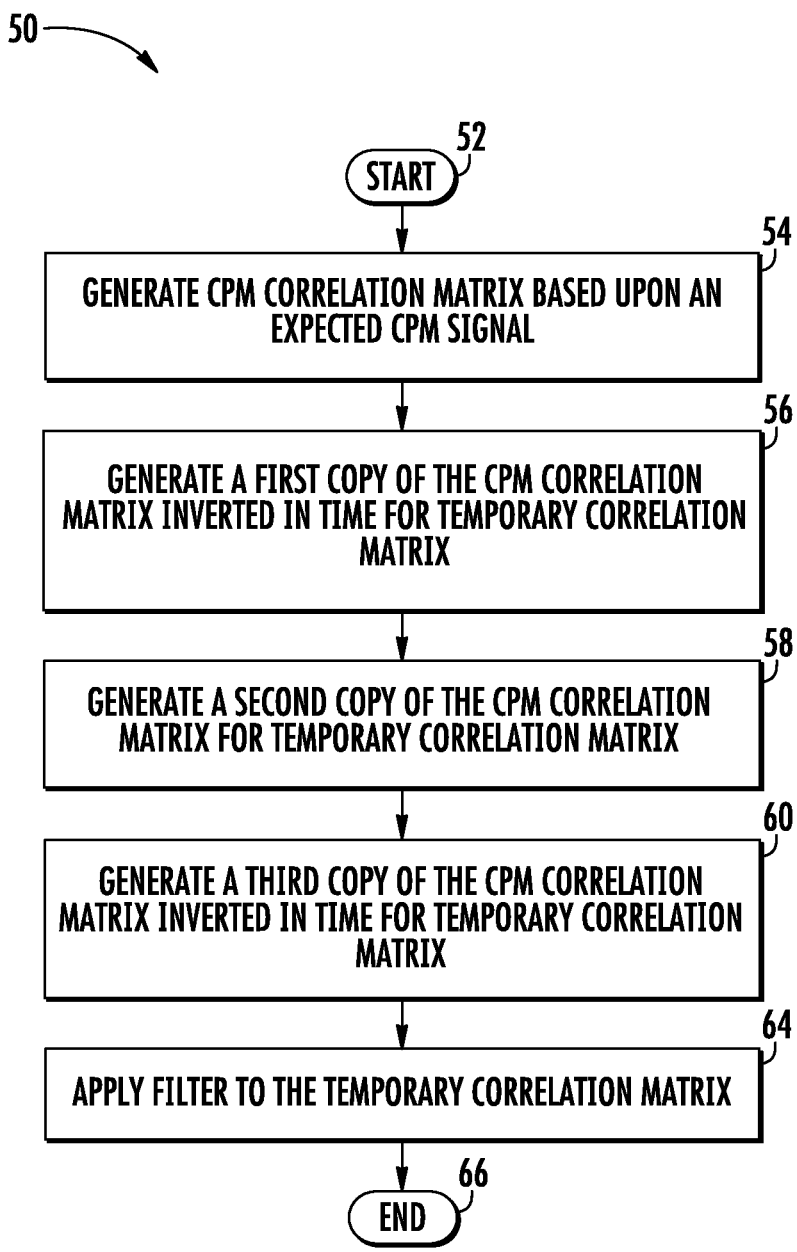
FIG. 2 is a flow chart illustrating operation of the demodulator of FIG. 1.

Referring initially to FIG. 1 and the flow chart 50 in FIG. 2, a receiver wireless communications device 20 includes a receiver 21. The receiver 21 is configured to receive a continuous phase modulation (CPM) signal. The CPM signal may be transmitted from a transmitter wireless communications device 37 that includes a processor 38, a wireless transmitter 39 coupled to the processor, and an antenna 40 coupled to the wireless transmitter. The transmitter wireless communications device 37 transmits a CPM signal to the receiver wireless communications device 20.

The receiver wireless communications device 20 also includes a demodulator 22 coupled downstream from the receiver 21. As shown in the illustrated embodiment, the demodulator 22 includes a processor 24, and a memory 25 cooperating therewith to perform the functions of the demodulator. In other embodiments, the demodulator 22 may include a software module.

As will be appreciated by those skilled in the art, the receiver wireless communications device 20 may be in the form of a portable radio and include other wireless communications circuitry. The receiver wireless communications device 20 may also include one or more input devices, for example, pushbuttons. An antenna 23 is coupled to the receiver 21. A transmitter may be collocated so the wireless communications device is in the form of a transceiver.

The standard equation (CPM) is shown in equation (1):

$$s(t)=\sqrt{2Es/Ts}\cos(2\pi ft+2\pi\Sigma_{i=0}^{n}\infty\, h_i q(t-iTs))\qquad(1)$$

where E is the symbol energy; $T_s$ is the symbol time; F is the carrier frequency; $\alpha=\alpha_i$ are M-ary data symbols, M even, taken from the alphabet $\{+/-1, +/-3, \ldots, (M-1)\}$; $h_1$ is a modulation index; $q(t)$ is the phase response and is normalized such that $q(t)=0$ for $t\leq 0$, $q(t)=½$ for $t\geq LT$; and L is the memory of the CPM scheme.

For example, the CPM signal may be a 5 kHz SATCOM mode CPM signal that uses a h=⅓ 4-ary 1 rectangular (REC) (i.e. frequency constant throughout symbol period), CPM modulation which can be non-coherently demodulated using multiple symbol correlation with 3 symbols of memory for 6 phase-states and a 4-ary modulation for a total of 64 correlations ($4^3$=64) per each receive demodulated symbol. Indeed, using multiple symbol correlation, a non-coherent receiver may achieve bit error rate performance of a coherent receiver. Although using multiple symbol correlation is CPU intensive, it does not rely on frequency or phase acquisition or tracking.

Expected CPM correlation values may be generated, and the set of 64 correlations or vectors may be pre-distorted using a filter, for example, a satellite filter. However, a satellite filter, for example, has a delay and an infinite impulse response. The satellite filter response crosses multiple symbols. Thus, a receiver may see this as inter-symbol interference, thus, the distortion on the current symbol may be affected by the value of the previous and next symbols (which is limited to three symbols in the above example of the 5 kHz SATCOM mode CPM signal).

To address this, starting at Block 52, the demodulator 22 generates a CPM correlation matrix based upon the expected CPM signal (Block 54) and generates a temporary correlation matrix. The temporary correlation matrix includes a first copy of the CPM correlation matrix inverted in time (Block 56), and a second copy of the CPM correlation matrix (Block 58). The temporary correlation matrix also includes a third copy of the CPM correlation matrix inverted in time (Block 60) so that the CPM phases are continuous. In other words, the demodulator 22 generates the temporary correlation matrix to have a size three times larger than a size of the CPM correlation matrix. In particular, for the 3 symbol 4-ary 5 kHz SATCOM mode CPM signal, the first copy is a backward 3 symbol CPM correlation matrix, the second copy is a forward 3 symbol CPM correlation matrix, and the third copy is a backward 3 symbol CPM correlation matrix. The phase of one of the vectors included within the CPM correlation matrix starts at 0°, goes to 180°, and then returns to 0°. This is just one example vector of 64 vectors, for example. In other words, the first, second, and third copies of the CPM correlation matrix are arranged so that the CPM phases are continuous. Of course, the temporary correlation matrix may have a size that is more than three times larger than the size of the CPM correlation matrix.

The demodulator 22 applies a filter to the temporary correlation matrix (Block 64). For example, for the 5 kHz SATCOM mode CPM signal, this filter may be a 5 kHz LIFO filter. The 5 kHz UFO filter may be represented as a $6^{th}$ order Chebyshev lowpass filter at 2.791 kHz, a $4^{th}$ order Chebyshev lowpass filter at 6.1B75 kHz, a hardlimiter, and a $6^{th}$ order Chebyshev lowpass filter at 3.2 kHz. Of course other satellite filters may be applied, for example, a 25 kHz filter. The applied filter may not be limited to a satellite filter, for example, and may be a multipath filter. In other words, the inter-symbol interference compensation described for SATCOM may also apply to any channel distortion that can be modeled a-priori. Accordingly, the expected CPM signal correlation values are generated and the set of 64 vectors are pre-distored using the filter model to arrive at a correlation the represents that is close to what is expect to be received. The method ends at Block 66.

Indeed, the demodulation process used by the demodulator 22 advantageously provides an easier implementation with respect to an LMS solution, for example, which may be extremely difficult to implement. The demodulation process used by the demodulator 22 may also advantageously address the ISI problems and expected correlation discontinuities that may occur with a quasi-coherent CPM correlation approach.

Transmitters with difficult-to-meet adjacent channel emissions requirements typically distort their transmit signals with narrowband IF filters, for example. This distortion may be accounted for by using the demodulator 22 as noted above because the transmitter is known and can be modeled. This also may advantageous with respect to narrowband IF filters that are used for adjacent channel rejection, for example. Additionally, the power used by the processor 24 for demodulating the CPM signal using the demodulator 22 is less intensive than other approaches.

Figure 3:
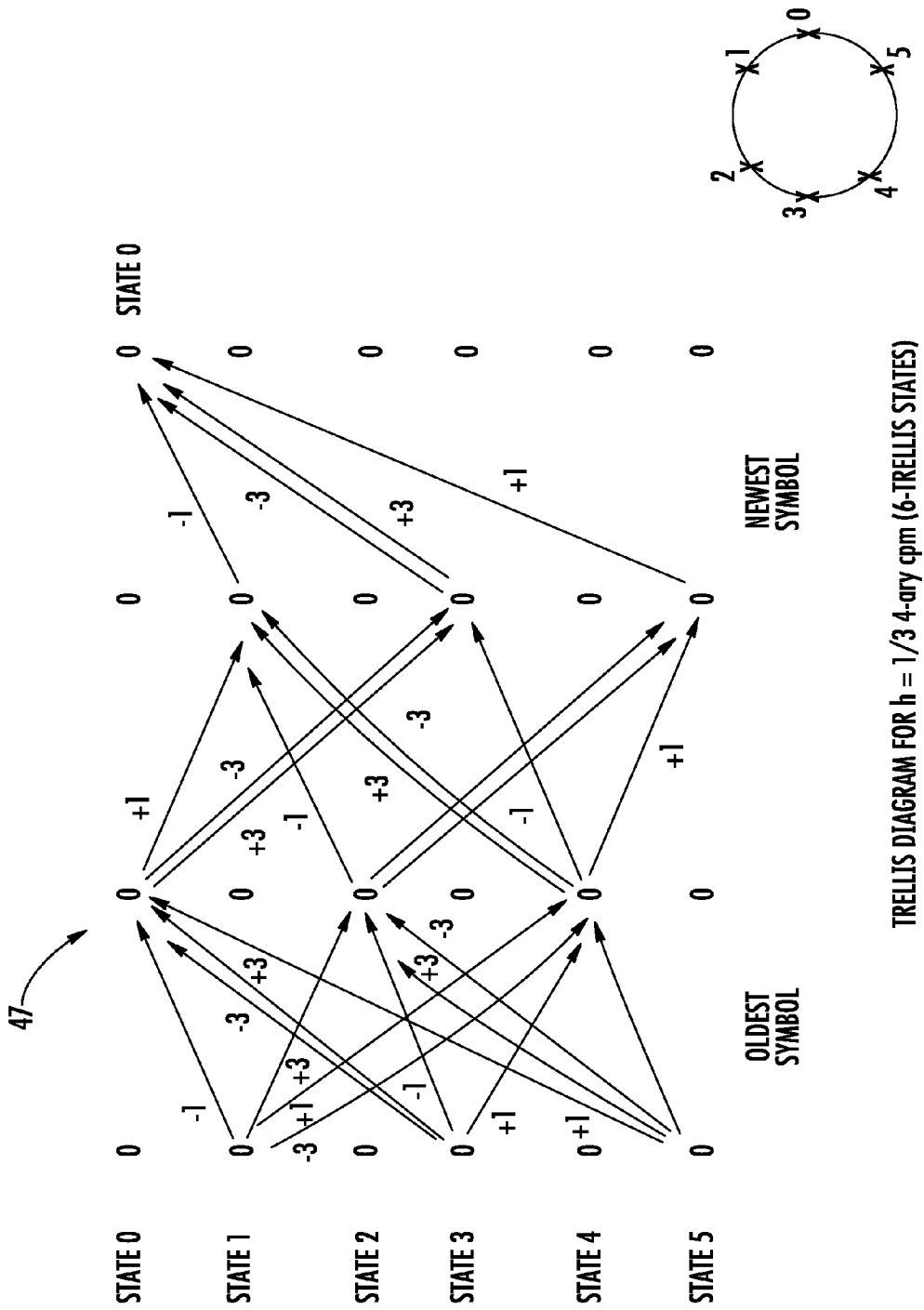
FIG. 3 is a trellis diagram illustrating quasi-coherent CPM as used in the demodulator of FIG. 1.

Referring now to FIG. 3, a trellis diagram 47 for 3 symbols of 4-ary h=⅓ REC CPM is illustrated. The diagram illustrates transmitted CPM memory, in particular, the continuous phases of CPM. As will be appreciated by those skilled in the art, the diagram in FIG. 3 is a diagram applied to the 5 kHz SATCOM mode CPM signal. The diagram assumes a 4-ary h=⅓ CPM constellation.

In a 4-ary CPM modulation scheme there are four symbols {−3, −1, 1, and 3}. Every state is equally spaced on the constellation. A positive-valued symbol transitions in a counter-clockwise direction. Similarly, a negatively-valued symbol with transition in a clockwise direction. The quasi-coherent CPM demodulation scheme implemented by the demodulator 22 honors a phase transition from symbol to symbol, but the phase of the final correlation is discarded. Thus, the correlation is complex-valued (with real and imaginary components), and the magnitude of the multi-symbol correlation is used to determine the winning symbol (bits), and the phase (inverse tangent of imaginary/real) is ignored.

The diagram in FIG. 3 assumes the end state is zero degrees. Of course, the incoming signal may not terminate at zero degrees for every incoming symbol. The actual phase of the correlation typically does not affect the performance of the correlation since the magnitude of the correlation is the basis of decision. It is the symbol-to-symbol phase transition that is expected to match the CPM trellis.

Figure 4:
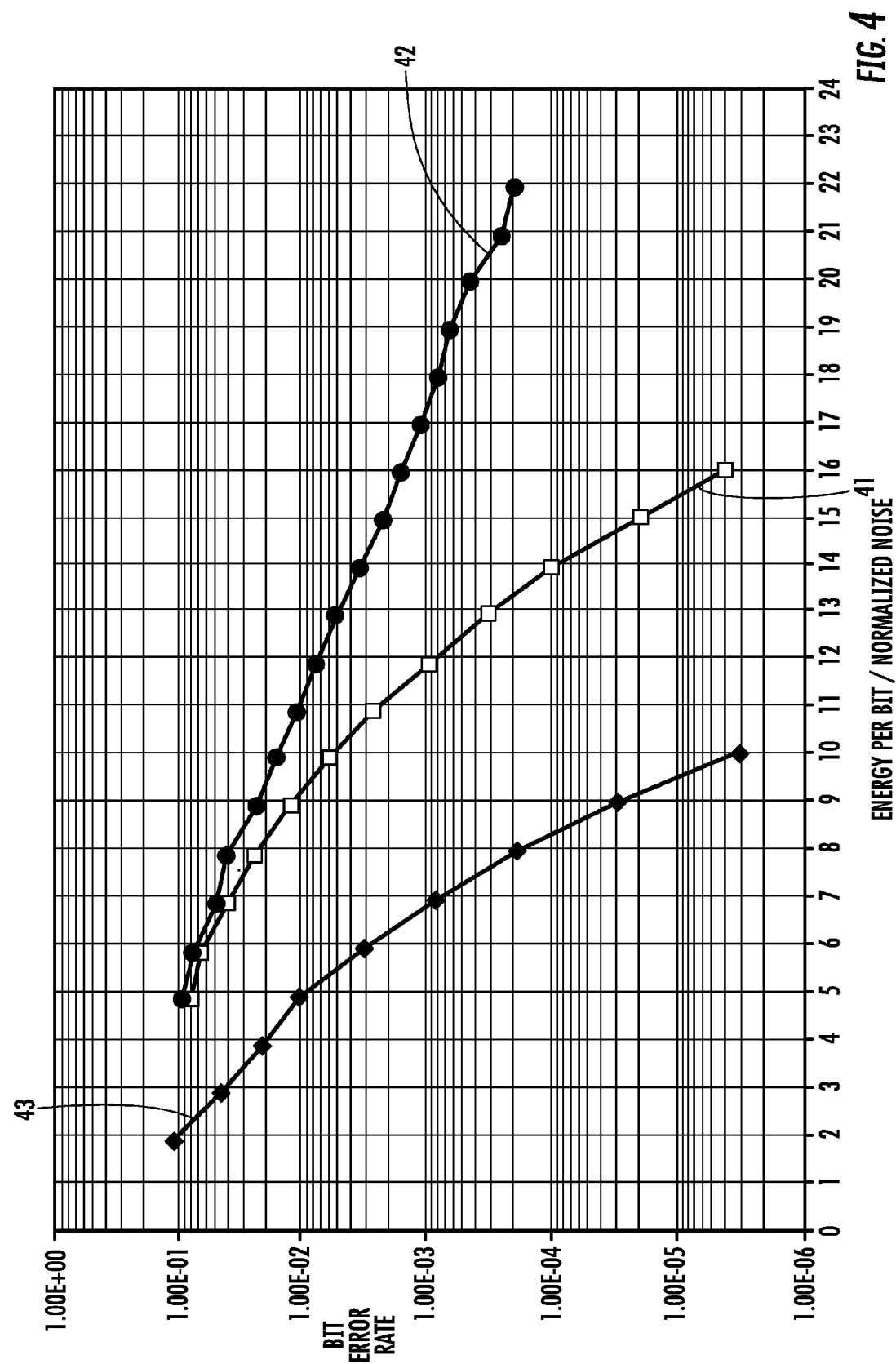
FIG. 4 is a bit error rate graph of satellite channel waveforms demodulated using various demodulation schemes.

Referring now additionally to the graph in FIG. 4, the bit error rates for an h=⅓ 4-ary non-coherent FSK 5 kHz satellite communications signal are illustrated. The line 41 corresponds to h=⅓ FSK demodulation (non-coherent). The line 42 corresponds to demodulation through a satellite channel filter and FSK. The line 43 corresponds to h=⅓ 4-ary CPFSK demodulation (coherent).

Figure 5:
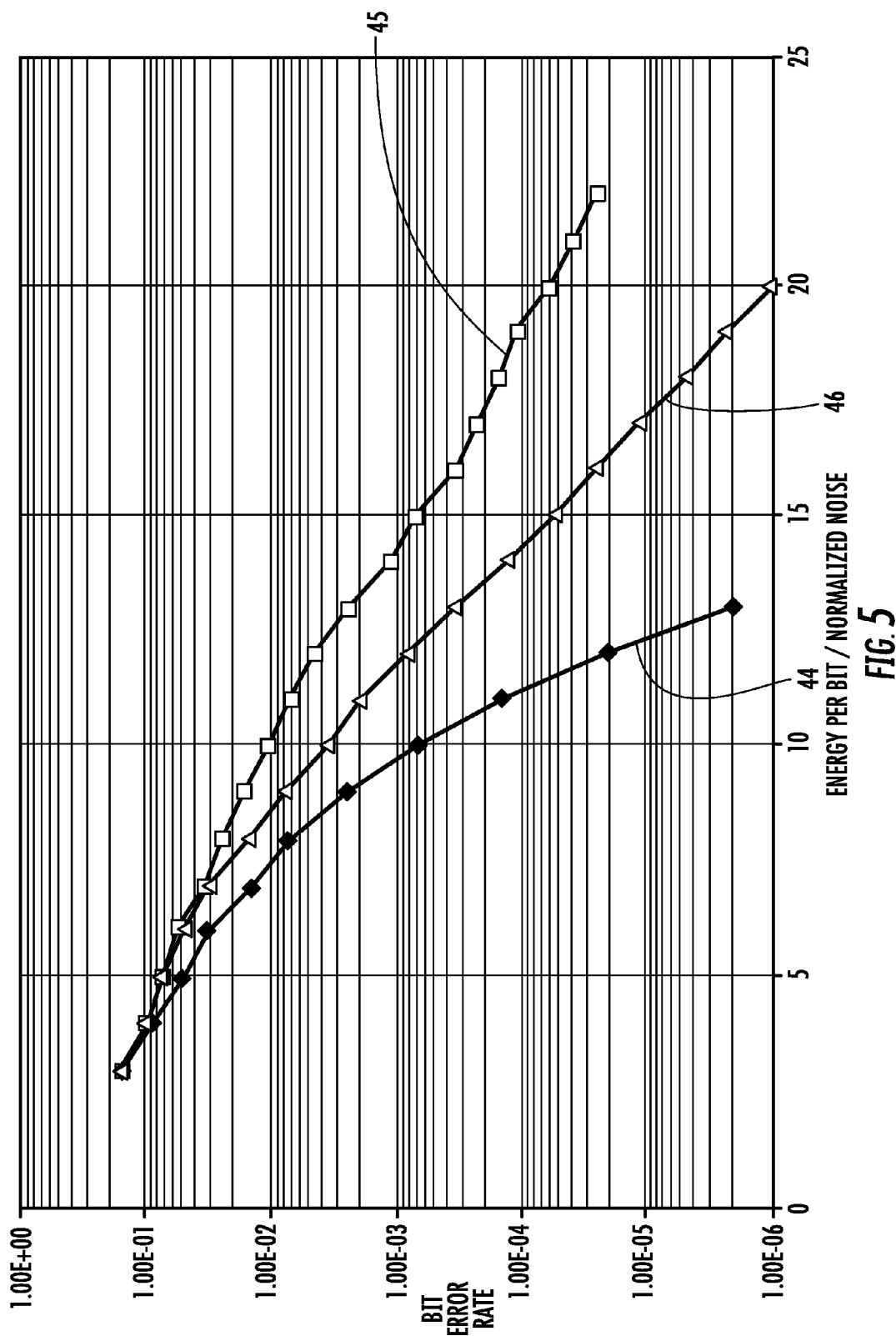
FIG. 5 is another bit error rate graph of waveforms demodulated using various demodulation schemes.

Referring now additionally to the graph in FIG. 5, the bit error rates for an h=⅓ 4-ary quasi-coherent CPM 5 kHz satellite communications signal are illustrated. The line 44 corresponds to h=⅓ with a 3-symbol decoding quasi-coherent demodulation. The line 45 corresponds to h=⅓ with a 3-symbol decoding and through a satellite channel filter. The line 46 corresponds to h=⅓ with a 3-symbol decoding, through a satellite channel filter, and decoding according to the method of the present embodiments. As will be appreciated by those skilled in the art, the signal decoded using h=⅓ with a 3-symbol decoding, through a satellite channel filter, and decoded according the method of the present embodiments (line 46) is advantageously reduceable. In other words, the decoded CPM signal may demodulate CPM signals with improved quality of service (QoS), such as BER, for example, over the satellite channel.

Additionally, while the present embodiments are described with respect to a 4-ary CPM waveform, other symbol alphabets may be used. For example, the demodulator 22 may be configured to demodulate the received CPM signal using a multiple of 4-ary modulation. Of course, other types of CPM modulation may be used, which may have different modulation indices (h-values), such as, for example, h=⅔, h=⅛, etc., various symbol alphabets, (binary, quaternary, 16-ary, etc., and various phase pulse shaping (rectangular (REC), raised-cosine (RC), Gaussian, etc.). Also, for quasi-coherent demodulation it each received symbol may be correlated against 3, 4, 5, etc. symbols of candidate expected symbols that comprise a continuous phase-modulated signal vector.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications device comprising:
 a receiver configured to receive a continuous phase modulation (CPM) signal; and
 a demodulator coupled downstream from said receiver and configured to
  generate a complex-valued CPM correlation matrix based upon an expected CPM signal, and
  generate a temporary correlation matrix comprising a first copy of the complex-valued CPM correlation matrix inverted in time, and a second copy of the complex-valued CPM correlation matrix.

2. The wireless communications device of claim 1, wherein said demodulator is configured to generate the temporary correlation matrix comprising a third copy of the complex-valued CPM correlation matrix inverted in time.

3. The wireless communications device of claim 2, wherein said demodulator is configured to generate the temporary correlation matrix having a size three times larger than a size of the complex-valued CPM correlation matrix.

4. The wireless communications device of claim 1, wherein said demodulator is configured to apply a filter to the temporary correlation matrix.

5. The wireless communications device of claim 4, wherein said filter comprises a Chebyshev filter.

6. The wireless communications device of claim 4, wherein said filter comprises a multipath filter.

7. The wireless communications device of claim 4, wherein said filter comprises a satellite communications channel filter.

8. The wireless communications device of claim 7, wherein said satellite communication channel filter comprises an ultra high frequency follow-on (UFO) satellite communications filter.

9. The wireless communications device of claim 8, wherein said UFO filter comprises a 5 kHz UFO channel filter.

10. The wireless communications device of claim 1, wherein said demodulator is configured to demodulate the received CPM signal using a multiple of 4-ary modulation.

11. The wireless communications device of claim 1, wherein said demodulator is configured to generate the complex-valued CPM correlation matrix as a 3 symbol correlation matrix.

12. A wireless communications device comprising:
 a receiver configured to receive a continuous phase modulation (CPM) signal; and
 a demodulator coupled downstream from said receiver and configured to
  generate a complex-valued CPM correlation matrix based upon an expected CPM signal,
  generate a temporary correlation matrix comprising a first copy of the complex-valued CPM correlation matrix inverted in time, a second copy of the complex-valued CPM correlation matrix, and a third copy of the complex-valued CPM correlation matrix inverted in time, and apply a satellite communications channel filter to the temporary correlation matrix.

13. The wireless communications device of claim 12, wherein said demodulator is configured to generate the temporary correlation matrix having a size three times larger than a size of the complex-valued CPM correlation matrix.

14. The wireless communications device of claim 12, wherein said satellite communications filter comprises an ultra high frequency follow-on (UFO) satellite communications filter.

15. The wireless communications device of claim 14, wherein said UFO filter comprises a 5 kHz UFO channel filter.

16. The wireless communications device of claim 12, wherein said demodulator is configured to demodulate the received CPM signal using a multiple of 4-ary modulation.

17. A method of demodulating a continuous phase modulation (CPM) signal with a wireless communications device comprising a demodulator coupled downstream from a receiver, the method comprising:

generating a complex-valued CPM correlation matrix based upon an expected CPM signal using the demodulator;

generating a temporary correlation matrix, using the demodulator, comprising a first copy of the complex-valued CPM correlation matrix inverted in time, and a second copy of the complex-valued CPM correlation matrix.

18. The method of claim 17, further comprising generating the temporary correlation matrix comprising a third copy of the complex-valued CPM correlation matrix inverted in time using the demodulator.

19. The method of claim 18, comprising generating the temporary correlation matrix to have a size three times larger than a size of the complex-valued CPM correlation matrix.

20. The method of claim 17, further comprising applying a filter to the temporary correlation matrix using the demodulator.

21. The method of claim 20, wherein applying the filter to the temporary correlation matrix comprises applying a Chebyshev filter to the temporary correlation matrix.

22. The method of claim 20, wherein applying a filter to the temporary correlation matrix comprises applying a multipath filter to the temporary correlation matrix.

23. The method of claim 20, wherein applying a filter to the temporary correlation matrix comprises applying a satellite communications channel filter to the temporary correlation matrix.

24. The method of claim 23, wherein applying the satellite communications channel filter to the temporary correlation matrix comprises applying an ultra high frequency follow-on (UFO) satellite communications filter to the temporary correlation matrix.

25. The method of claim 24, applying the ultra high frequency follow-on (UFO) satellite communications filter to the temporary correlation matrix comprises applying a 5 kHz UFO channel filter to the temporary correlation matrix.

* * * * *